(12) United States Patent
Jung et al.

(10) Patent No.: US 12,449,377 B2
(45) Date of Patent: Oct. 21, 2025

(54) METHOD OF INSPECTING SEMICONDUCTOR DEVICE

(71) Applicant: SAMSUNG ELECTRONICS CO., LTD., Suwon-si (KR)

(72) Inventors: Daehyun Jung, Suwon-si (KR); Yujeong Sin, Suwon-si (KR); Sunggon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 18/228,807

(22) Filed: Aug. 1, 2023

(65) Prior Publication Data
US 2024/0230554 A1    Jul. 11, 2024

(30) Foreign Application Priority Data
Jan. 9, 2023   (KR) .......................... 10-2023-0002781

(51) Int. Cl.
*G01N 21/95*       (2006.01)
*G01N 21/88*       (2006.01)
*G01N 21/956*      (2006.01)

(52) U.S. Cl.
CPC ..... *G01N 21/9501* (2013.01); *G01N 21/8851* (2013.01); *G01N 21/956* (2013.01); *G01N 2021/8858* (2013.01); *G01N 2021/8864* (2013.01)

(58) Field of Classification Search
CPC ........... G01N 21/9501; G01N 21/8851; G01N 21/956; G01N 2021/8858; G01N 2021/8864; G01N 2021/8887; G06T 7/0004; H01L 22/12; H01L 22/20
See application file for complete search history.

(56) References Cited

U.S. PATENT DOCUMENTS

| | | |
|---|---|---|
| 6,035,244 A | 3/2000 | Chen et al. |
| 6,468,815 B1 | 10/2002 | Steffan et al. |
| 7,729,529 B2 | 6/2010 | Wu et al. |
| 8,111,900 B2 | 2/2012 | Wu et al. |
| 8,266,555 B2 | 9/2012 | Kim |
| 8,559,001 B2 | 10/2013 | Chang et al. |
| 8,595,666 B2 | 11/2013 | Hayakawa et al. |
| 9,165,356 B2 | 10/2015 | Harada et al. |
| 9,922,414 B2 | 3/2018 | Takagi et al. |
| 9,940,704 B2 | 4/2018 | Yati |

(Continued)

FOREIGN PATENT DOCUMENTS

| | | |
|---|---|---|
| JP | 9-266235 A | 10/1997 |
| KR | 10-1068321 B1 | 9/2011 |

(Continued)

*Primary Examiner* — Seung C Sohn
(74) *Attorney, Agent, or Firm* — Sughrue Mion, PLLC (57) ABSTRACT

A method of inspecting a semiconductor device, includes: scanning a plurality of first circuit pattern layers of the semiconductor device and generating a plurality of first images respectively corresponding the plurality of first circuit pattern layers of the semiconductor device; overlapping the plurality of first images with each other and counting a plurality of first defects in the overlapped first images; setting main inspection areas with priority orders by using position coordinates of the counted first defects; and storing the main inspection areas with the position coordinates of the counted first defects.

20 Claims, 5 Drawing Sheets

(56) References Cited

U.S. PATENT DOCUMENTS

| | | | |
|---|---|---|---|
| 10,989,672 B2 | 4/2021 | Kaneko | |
| 2001/0016061 A1* | 8/2001 | Shimoda | H01L 22/20 |
| | | | 382/149 |
| 2009/0196490 A1* | 8/2009 | Matsumiya | G06V 10/7515 |
| | | | 382/149 |

FOREIGN PATENT DOCUMENTS

| | | |
|---|---|---|
| KR | 10-1296532 B1 | 8/2013 |
| KR | 10-1799799 B1 | 11/2017 |

* cited by examiner

METHOD OF INSPECTING SEMICONDUCTOR DEVICE

CROSS-REFERENCE TO RELATED APPLICATIONS

This application claims priority under 35 U.S.C. § 119 to Korean Patent Application No. 10-2023-0002781, filed on Jan. 9, 2023 in the Korean Intellectual Property Office, the disclosure of which is incorporated herein by reference in its entirety.

BACKGROUND

1. Field

The disclosure relates to a method of inspecting a semiconductor device. More particularly, the disclosure relate to a method of inspecting a semiconductor device having a plurality of circuit pattern layers.

2. Description of the Related Art

A defect inspection method may be used to increase a yield of a semiconductor device having a plurality of circuit pattern layers. A hot spot generated between the plurality of circuit pattern layers may affect defects in other circuit pattern layers. A method of inspecting defects by comparing each of the circuit pattern layers with stored images may not reflect influence relationships between circuit pattern layers, such as hot spots. When the influence relationships between the plurality of circuit pattern layers are not reflected, reliability of defect inspection may be reduced.

SUMMARY

Provided is a method of inspecting semiconductor device, which improves defect inspection reliability by reflecting influence relationships between a plurality of circuit pattern layers.

According to one aspect of the disclosure, a method of inspecting a semiconductor device, includes: scanning a plurality of first circuit pattern layers of the semiconductor device and generating a plurality of first images respectively corresponding the plurality of first circuit pattern layers of the semiconductor device: overlapping the plurality of first images with each other and counting a plurality of first defects in the overlapped first images: setting main inspection areas with priority orders by using position coordinates of the counted first defects; and storing the main inspection areas with the position coordinates of the counted first defects.

According to another aspect of the disclosure, a method of inspecting a semiconductor device, includes: scanning a plurality of circuit pattern layers of the semiconductor device in a process of manufacturing the semiconductor device and generating a plurality of images respectively corresponding the plurality of circuit pattern layers of the semiconductor device: overlapping the plurality of images with each other and counting a plurality of defects in the overlapped images: setting main inspection areas with priority orders based on a number of the counted defects; storing the main inspection areas with position coordinates of the counted defects.

According to another aspect of the disclosure, a method of inspecting a semiconductor device, the method includes: scanning a plurality of circuit pattern layers of a semiconductor device in a process of manufacturing the semiconductor device and generating a plurality of images respectively corresponding to the scanned circuit pattern layers; overlapping the plurality of images with each other and count a plurality of defects on the plurality of circuit pattern layers based on a number of the plurality of defects in the overlapped images: setting main inspection areas with priority orders by using position coordinates of the counted defects: classifying and storing the main inspection areas with the position coordinates of the counted defects based on a type of the semiconductor devices: scanning the plurality of circuit pattern layers of the semiconductor device in the stored main inspection areas based on the priority orders: obtaining the position coordinates of the plurality of defects from the plurality of circuit pattern layers scanned based on the priority orders; and updating the main inspection areas based on the obtained position coordinates of the plurality of defects.

Thus, the method may number or count the defects overlapping each other between the circuit pattern layers based on the number of overlapping defects. Since the main inspection areas are set through the position coordinates of the numbered or counted defects, an area where the defects occur the most among the plurality of circuit pattern layers of the semiconductor device may be specified through the main inspection areas. The main inspection areas may include hot spots affecting between the plurality of circuit pattern layers. An area where the defect is likely to occur among the plurality of circuit pattern layers may be specified through the main inspection areas, and the defects of the semiconductor devices may be quickly and accurately inspected.

Also, the method may increase reliability of the main inspection areas through repeated inspection processes. In the method, the main inspection areas may be transferred to semiconductor device manufacturing equipment configured to manufacture the semiconductor device, and may be utilized. The method may increase the reliability of the main inspection areas through the position coordinates of the defect obtained from the semiconductor device manufacturing equipment.

BRIEF DESCRIPTION OF DRAWINGS

The disclosure will be more clearly understood from the following detailed description taken in conjunction with the accompanying drawings. FIGS. 1 to 5 represent non-limiting, example embodiments as described herein.

DETAILED DESCRIPTION

Hereinafter, the disclosure will be explained in detail with reference to the accompanying drawings.

Referring to FIGS. 1 to 5, first, in a method of inspecting a semiconductor device, each of a plurality of the circuit pattern layers 30 may be scanned from the semiconductor devices 10 that have a plurality of circuit pattern layers 30 (operation S100).

In example embodiments, the method may be referred to as a test method capable of improving reliability of the semiconductor device 10. The method may detect defects in the semiconductor devices 10 having the plurality of circuit pattern layers 30. For example, the method may be performed during a semiconductor device manufacturing process configured to manufacture the semiconductor devices 10.

Figure 2:
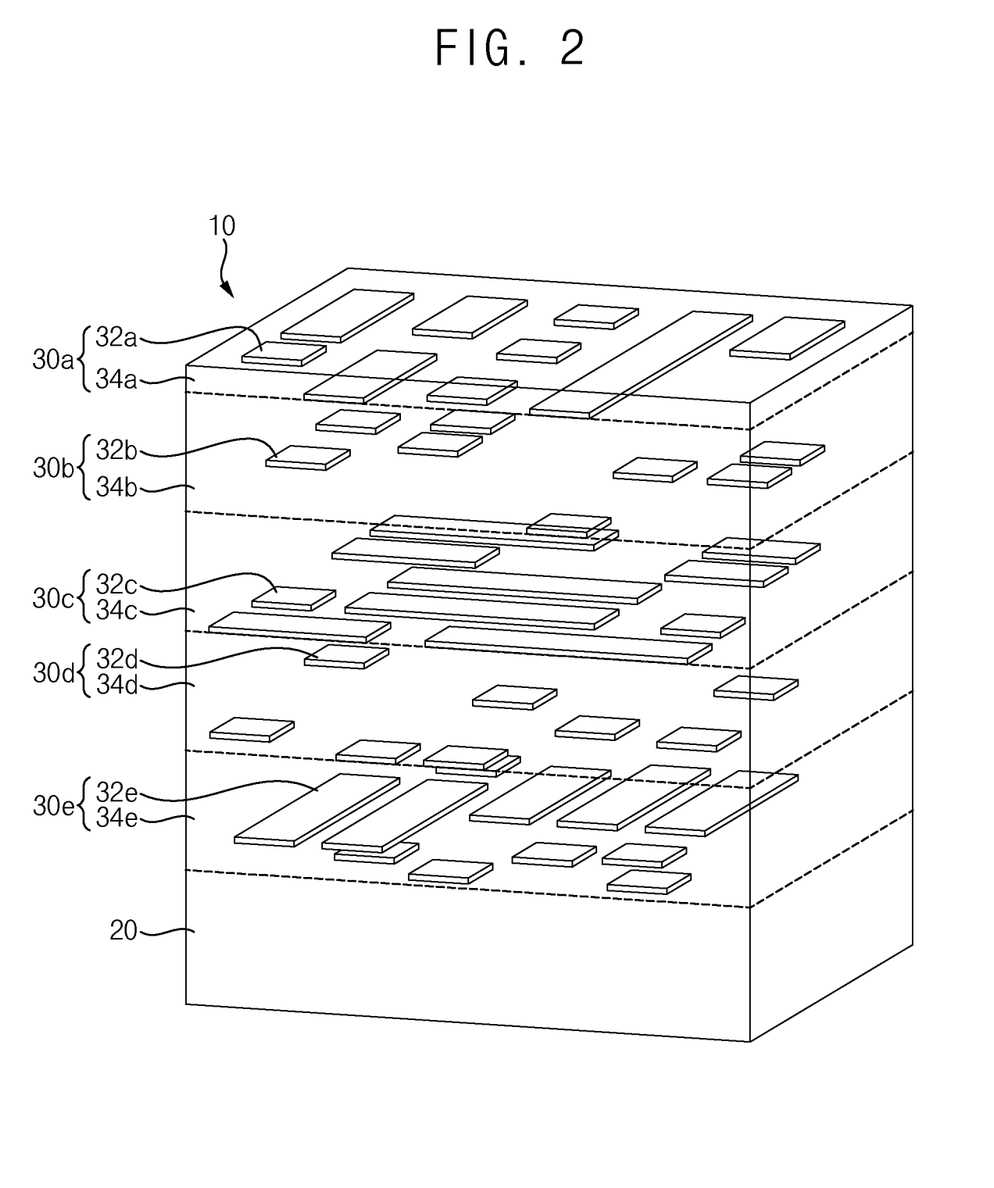
FIG. 2 illustrates a semiconductor device having a plurality of circuit pattern layers.

As illustrated in FIG. 2, the semiconductor device 10 may include the plurality of circuit pattern layers 30 formed on a silicon layer 20. The plurality of circuit pattern layers 30 may include first to fifth circuit pattern layers 30*a*, 30*b*, 30*c*, 30*d*, and 30*e*. During the semiconductor device manufacturing process, the first to fifth circuit pattern layers 30*a*, 30*b*, 30*c*, 30*d*, and 30*e* may be sequentially stacked on the silicon layer 20.

The first to fifth circuit pattern layers 30*a*, 30*b*, 30*c*, 30*d*, and 30*e* may include first to fifth insulating layers 34*a*, 34*b*, 34*c*, 34*d*, and 34*e*, and first to fifth circuit patterns 32*a*, 32*b*, 32*c*, 32*d*, and 32*e* provided in the first to fifth insulating layers, respectively. The first to fifth insulating layers may include a polymer or a dielectric layer. The first to fifth circuit patterns may include aluminum (Al), copper (Cu), tin (Sn), nickel (Ni), gold (Au), platinum (Pt), or an alloy thereof.

In the disclosure, the semiconductor device 10 is illustrated as having five circuit pattern layers, but it will be appreciated that the number of circuit pattern layers is not limited thereto.

The defects may be formed in the semiconductor device 10 during the semiconductor device manufacturing process. The defects may be formed on each of the circuit pattern layers 30. The defects may occur on the first to fifth circuit patterns 32*a*, 32*b*, 32*c*, 32*d*, and 32*e* of the first to fifth circuit pattern layers 30*a*, 30*b*, 30*c*, 30*d*, and 30*e*. Each of the defects may have position coordinates 42 (as illustrated as 42*a*, 42*b*, 42*c*, 42*d*, and 42*e* in FIGS. 3 and 4) that indicate a location where the defects are formed.

The defects may reduce electrical characteristics of the semiconductor device 10. The defects may interfere with an operation of the semiconductor device 10. The defects may shift an atomic arrangement layer in the semiconductor device 10, and reliability of the semiconductor device 10 may be reduced by mechanical stress.

For example, the defects may include point defects, line defects, plane defects, and volume defects. The line defects may include edge dislocation and screw dislocation. The plane defects may include a stacking fault or a twin fault.

Figure 3:
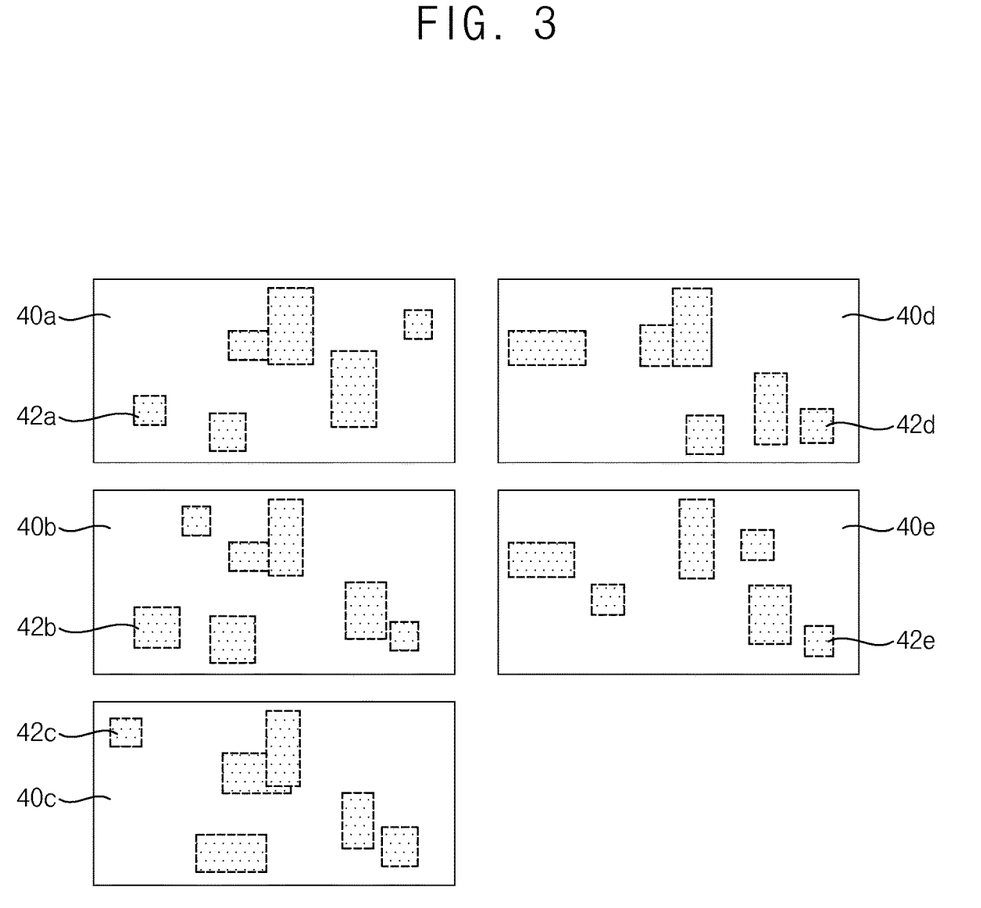
FIG. 3 illustrates images scanned from the plurality of circuit pattern layers of the semiconductor device in FIG. 2.

As illustrated in FIG. 3, in the method, each of the plurality of circuit pattern layers 30 may be scanned to obtain images.

The images 40 may display the position coordinates 42 that indicate locations of the defects. The position coordinates 42 may be displayed as a specific point or a specific area. The position coordinates 42 may include a hot spot library having hot spot data.

In processes of forming the first to fifth circuit pattern layers 30*a*, 30*b*, 30*c*, 30*d*, and 30*e*, each of the first to fifth circuit pattern layers 30*a*, 30*b*, 30*c*, 30*d*, and 30*e* may be scanned to obtain the images. Alternatively, the images may be obtained from the completed semiconductor device 10 having the first to fifth circuit pattern layers 30*a*, 30*b*, 30*c*, 30*d*, and 30*e*.

First to fifth images 40*a*, 40*b*, 40*c*, 40*d*, and 40*e* (collectively called as "images 40") may be obtained from the first to fifth circuit pattern layers 30*a*, 30*b*, 30*c*, 30*d*, and 30*e*, respectively. The first to fifth images 40*a*, 40*b*, 40*c*, 40*d*, and 40*e* may include first to fifth position coordinates 42*a*, 42*b*, 42*c*, 42*d*, and 42*e* that are formed on the first to fifth circuit pattern layers 30*a*, 30*b*, 30*c*, 30*d*, and 30*e*, respectively. The first to fifth position coordinates 42*a*, 42*b*, 42*c*, 42*d*, and 42*e* may be displayed as the specific area on the first to fifth images 40*a*, 40*b*, 40*c*, 40*d*, and 40*e*, respectively.

The images 40 may represent each of the circuit pattern layers 30 on a two-dimensional plan view. The images 40 may represent each of the circuit pattern layers 30 through a polygon mesh. The images 40 may represent each of the circuit pattern layers 30 through a graphic design system (GDS). The graphic design system may interwork with semiconductor device manufacturing equipment configured to manufacture the semiconductor device 10.

The position coordinates 42 may be obtained during the semiconductor device manufacturing process configured to manufacture the semiconductor device 10. Each of the first to fifth circuit pattern layers 30*a*, 30*b*, 30*c*, 30*d*, and 30*e* may be scanned to obtain the first to fifth position coordinates 42*a*, 42*b*, 42*c*, 42*d*, and 42*e* in each of the above processes in which each of the circuit pattern layers 30 are formed. Alternatively, the position coordinates may be obtained from the completed semiconductor device 10 having the first to fifth circuit pattern layers 30*a*, 30*b*, 30*c*, 30*d*, and 30*e*.

The method may scan all the circuit pattern layers 30 in the semiconductor device 10 through a precise measurement method. The method may scan all of the first to fifth circuit pattern layers 30*a*, 30*b*, 30*c*, 30*d*, and 30*e* through the precision measurement method, and all of the position coordinates 42 may be obtained from the images of the first to fifth circuit pattern layers 30*a*, 30*b*, 30*c*, 30*d*, and 30*e*.

Alternatively, in the method, the precise measurement method may be used together with a random measurement method. The method may measure a region where the defects (e.g., Si defects) are likely to occur through the precision measurement method, and the method may measure other region through the random measurement method. For example, in the method, half of regions of the circuit pattern layers 30 may be scanned through the random measurement method.

Figure 4:
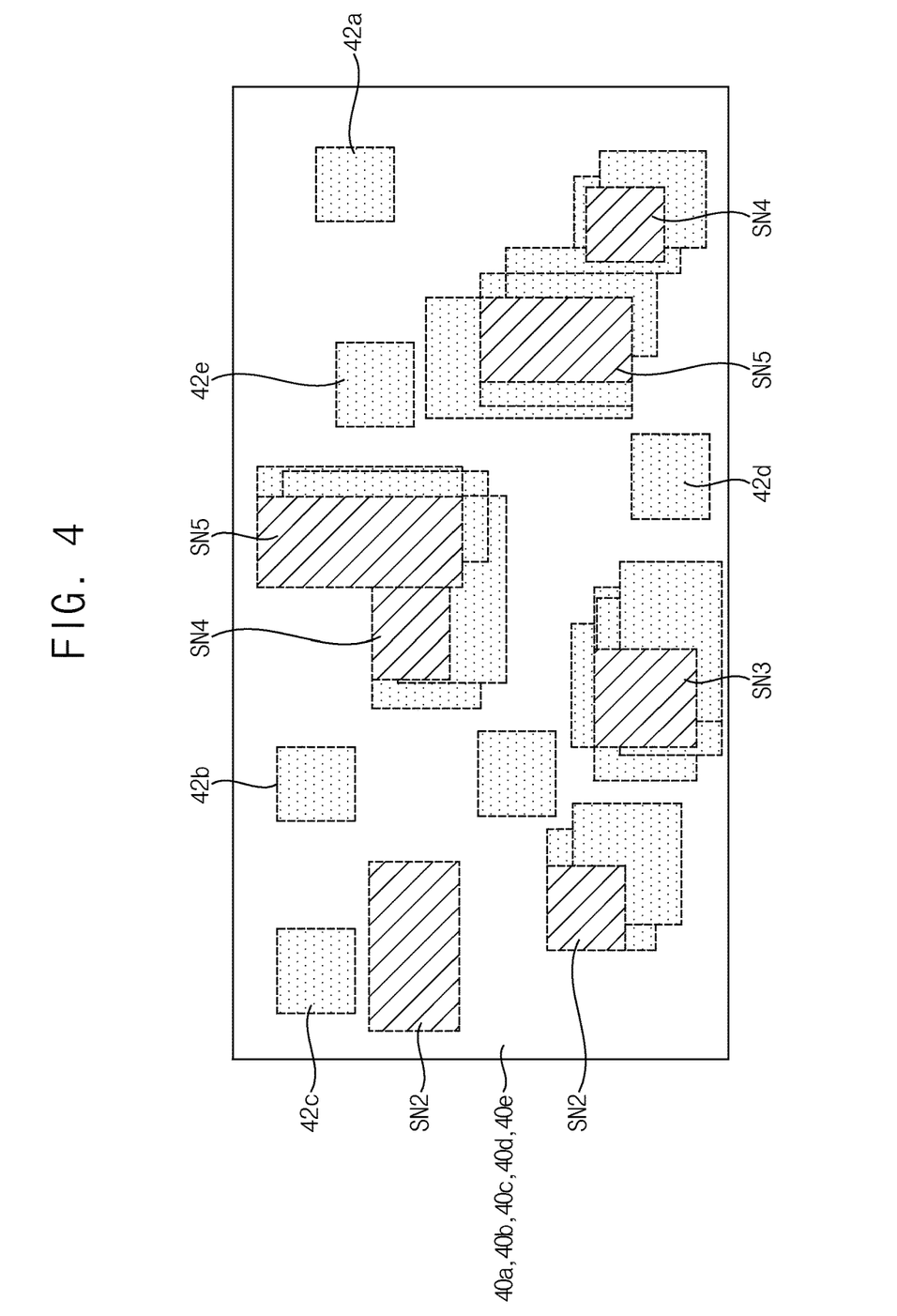
FIG. 4 illustrates the overlapped images in FIG. 3.

As illustrated in FIG. 4, then, the images 40 (40*a*, 40*b*, 40*c*, 40*d*, 40*e*) scanned from each of the circuit pattern layers 30 may be overlapped with each other, and the defects may be numbered based on a number of times that the defects are overlapped (operation S110).

In example embodiments, the images 40 scanned from the circuit pattern layers 30 may have overlay keys, respectively. The images may be sorted through the overlay keys. The first to fifth images 40*a*, 40*b*, 40*c*, 40*d*, and 40*e* may be overlapped with each other through the overlay keys, and the first to fifth position coordinates 42*a*, 42*b*, 42*c*, 42*d*, and 42*e* may be overlapped with each other.

The overlapped position coordinates 42 may be numbered based on the number of overlaps. At least portions of the first to fifth position coordinates 42*a*, 42*b*, 42*c*, 42*d*, and 42*e* may overlap each other. The at least portion of the first to fifth position coordinates 42*a*, 42*b*, 42*c*, 42*d*, and 42*e* overlapping each other may be counted based on an overlapping area. For example, the at least portions of the first to fifth position coordinates 42*a*, 42*b*, 42*c*, 42*d*, and 42*e* may include a second overlapping area SN2 overlapping twice, a third overlapping area SN3 overlapping three times, a fourth overlapping area SN4 overlapping four times, and a fifth overlapping area SN5 overlapping five times.

The first to fifth position coordinates 42*a*, 42*b*, 42*c*, 42*d*, and 42*e* of the first to fifth circuit pattern layers 30*a*, 30*b*, 30*c*, 30*d*, and 30*e* may be numbered based on the number of overlapping regardless of the position of the circuit pattern layers 30. Alternatively, when the defects overlap from circuit pattern layers adjacent to each other among the stacked first to fifth circuit pattern layers 30a, 30b, 30c, 30d, and 30e, the first to fifth position coordinates 42a, 42b, 42c, 42d, and 42e may be numbered based on the number of times that the defects are overlapped.

A weight (e.g., importance) of the numbered position coordinates 42 may be set based on the number of times that the defects are overlapped. The hot spot library of the circuit pattern layers 30 adjacent to each other may be overlapped, and the weight may be assigned based on the number of times of overlapping. The weight may represent a region where the defects are likely to occur.

For example, the fifth overlapping area SN5 may have a higher weight than the second to fourth overlapping areas SN2, SN3, and SN4. The fourth overlapping area SN4 may have a higher weight than the second and third overlapping areas SN2 and SN3. The third overlapping area SN3 may have a higher weight than the second overlapping area SN2.

The weight of the second to fifth overlapping areas SN2, SN3, SN4, and SN5 may be used in a process of scanning the first to fifth circuit pattern layers 30a, 30b, 30c, 30d, and 30e of the same type of semiconductor device as the semiconductor device 10. For example, the first to fifth circuit pattern layers 30a, 30b, 30c, 30d, and 30e may be scanned with increased scanning accuracy within the second to fifth overlapping regions SN2, SN3, SN4, and SN5 that have high weights. A scan speed of the semiconductor device 10 may be increased through the weights.

A density of the defects may be calculated through the numbered position coordinates 42 based on the second to fifth overlapping areas SN2, SN3, SN4, and SN5. The weight may be set based on the density, and an accuracy of the weight may be increased. For example, a region having a high density of the defects in the second to fifth overlapping regions SN2, SN3, SN4, and SN5 may be set to have a high weight, and a region having a low density of the defects may be set to have a low weight.

As illustrated in FIG. 4, then, main inspection areas having priority order may be set through the position coordinates 42 of the numbered or counted defects (operation S120).

Figure 5:
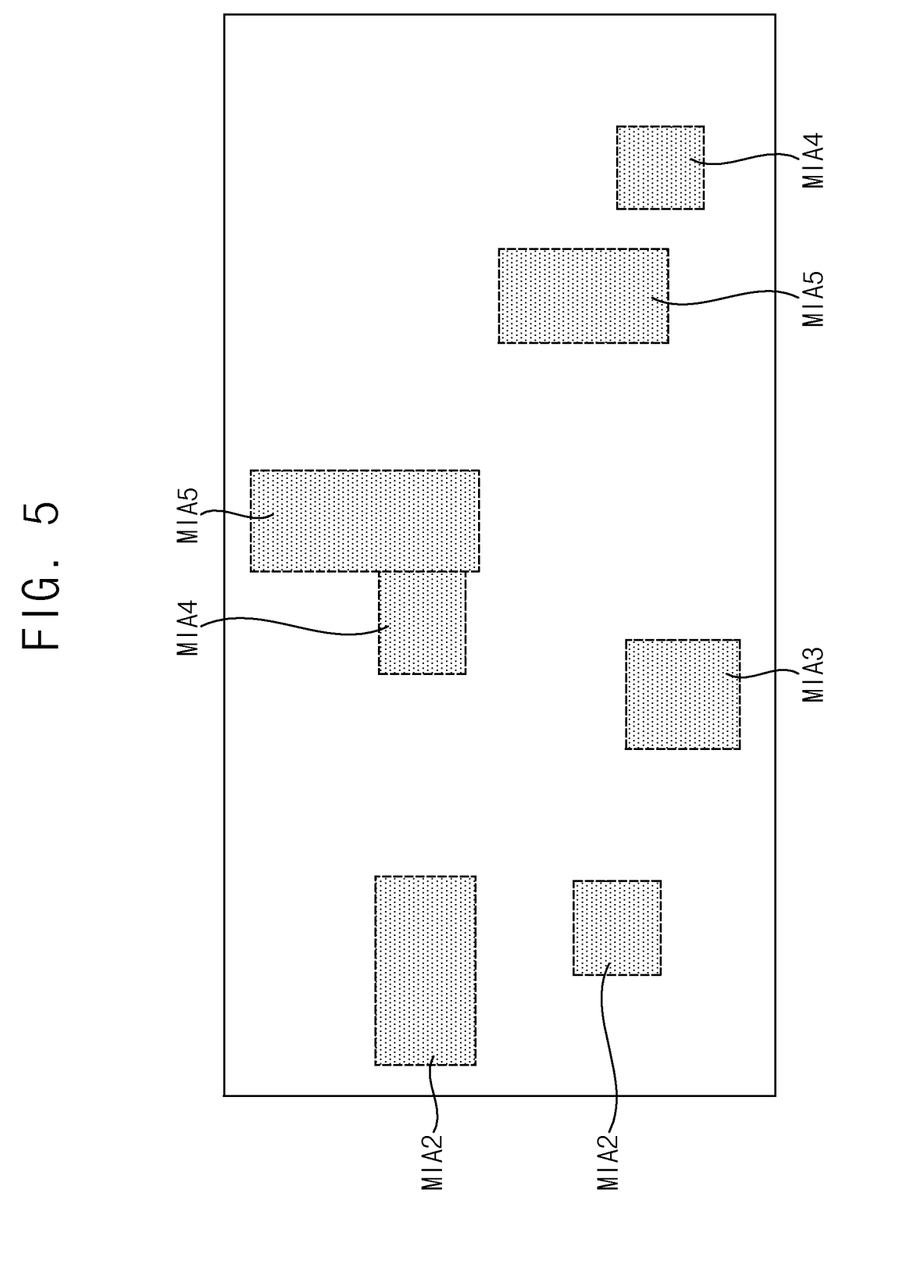
FIG. 5 illustrates main inspection areas set from the overlapped images in FIG. 4.

In example embodiments, the main inspection areas may be set based on the overlapping number of the defects. The main inspection areas may be set through processes of setting the priority (e.g., an NPI layer number) order based on the weight and setting a detect inspection area where the defects are likely to occur. The main inspection areas may be referred to as areas with a high possibility of occurrence of the defects. The main inspection area may include the hot spot library.

In the method, the defect (e.g., Si defect) may be found to generate the hot spot library through a priority scan area generator in the manufacturing process (all layer operations) of all the circuit pattern layers 30. The priority scan area generator may have an algorithm capable of setting the main inspection areas.

The main inspection areas may be formed on the images 40. The main inspection areas may be expressed on a two-dimensional plane or in a three-dimensional space. The main inspection areas may include the position coordinates 42 of the numbered or counted defects.

The main inspection areas may include second to fifth main inspection areas MIA2, MIA3, MIA4, and MIA5. The second to fifth main inspection areas MIA2, MIA3, MIA4, and MIA5 may be set differently based on the weight. The second to fifth main inspection areas MIA2, MIA3, MIA4, and MIA5 may be set differently based on the type of semiconductor device 10. The priority order of the second to fifth main inspection areas MIA2, MIA3, MIA4, and MIA5 may be set through the weight.

The priority order may be set based on a highest probability of occurrence of the defects. For example, the fifth main inspection area MIA5 may have a higher priority order than the second to fourth main inspection areas MIA2, MIA3, and MIA4. The fourth main inspection area MIA4 may have a higher priority order than the second and third main inspection areas MIA2 and MIA3. The third main inspection area MIA3 may have a higher priority order than the second main inspection area MIA2.

The second to fifth main inspection areas MIA2, MIA3, MIA4, and MI5 may be the same areas as the second to fifth overlapping areas SN2, SN3, SN4, and SN5. Alternatively, the second to fifth main inspection areas MIA2, MIA3, MIA4, and MI5 may be set based on the density of the defects in the second to fifth overlapping areas SN2, SN3, SN4, and SN5. The priority order of the second to fifth main inspection areas MIA2, MIA3, MIA4, and MI5 may be set differently based on areas that have the high density of defects.

The second to fifth main inspection areas MIA2, MIA3, MIA4, and MI5 may include data of the first to fifth circuit pattern layers 30a, 30b, 30c, 30d, and 30e where the defects occur. Each of the second to fifth main inspection areas MIA2, MIA3, MIA4, and MI5 may display a specific circuit pattern layer that has the defect among the first to fifth circuit pattern layers 30a, 30b, 30c, 30d, and 30e.

The second to fifth main inspection areas MIA2, MIA3, MIA4, and MI5 may include type data (e.g., rough BIN) of the defects. The type data may include data about causes of the defects. The second to fifth main inspection areas MIA2, MIA3, MIA4, and MI5 may display defects that is generated on the first to fifth circuit pattern layers 30a, 30b, 30c, 30d, and 30e in association with the type data that is input by an user.

Figure 1:
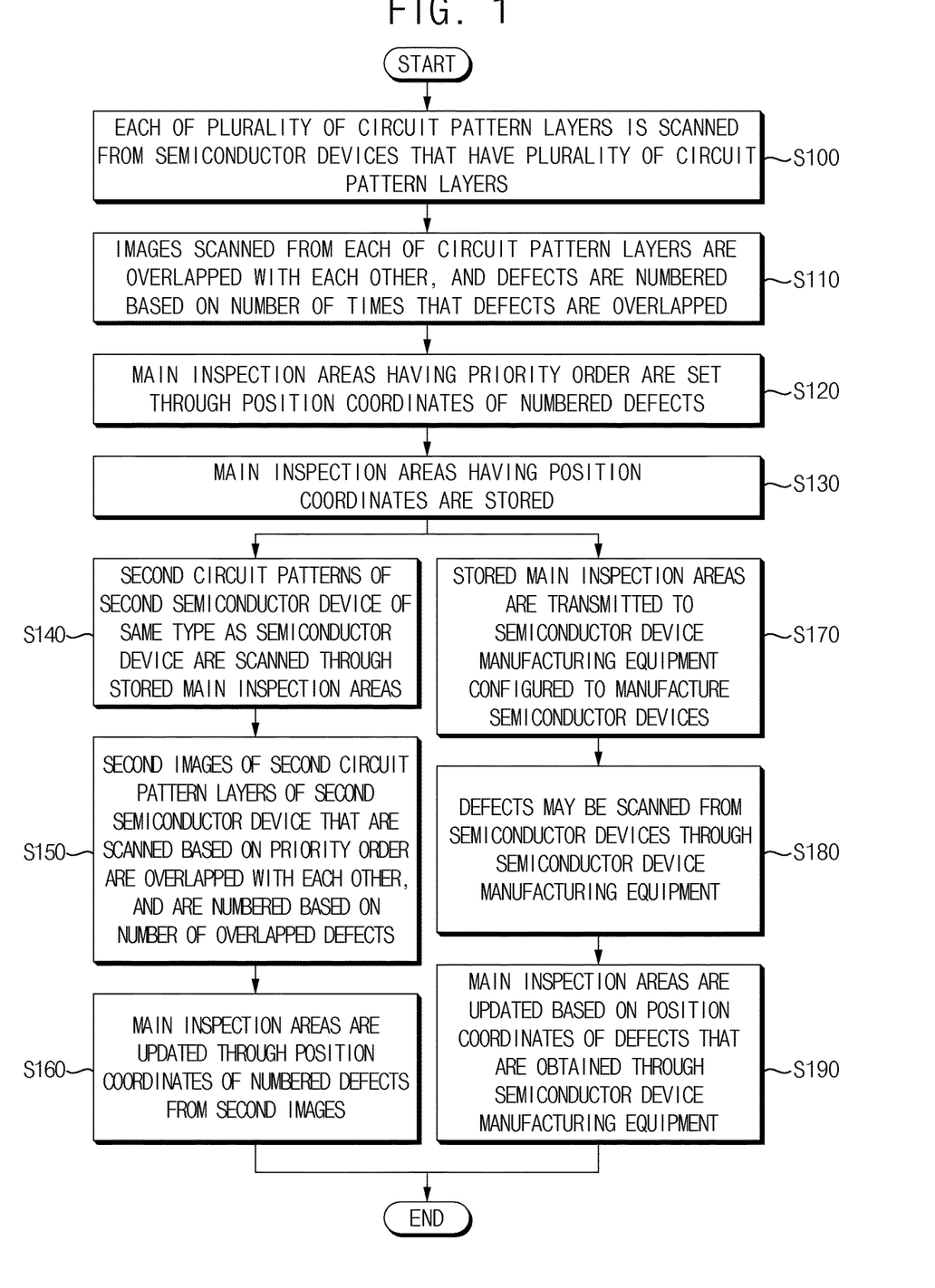
FIG. 1 illustrates a method of inspecting a semiconductor device in accordance with example embodiments.

In example embodiments, then, the main inspection areas having the position coordinates 42 may be stored (operation S130). Data of a hot spot scan area calculated through the position coordinates and the priority order may be added to the priority scan area generator.

In one embodiment, the main inspection areas may be stored in association with the location of the specific circuit pattern layer in which the defect occurs among the plurality of circuit pattern layers 30. The second to fifth main inspection areas MIA2, MIA3, MIA4, and MIA5 areas may be stored in association with the location of the specific circuit pattern layer among the first to fifth circuit pattern layers 30a, 30b, 30c, 30d, and 30e. The location of the specific circuit pattern layer in which the defect occurs may be determined through the second to fifth main inspection areas MIA2, MIA3, MIA4, and MIA5.

The main inspection areas may be classified and stored based on types of the semiconductor devices. The type of the defective semiconductor device 10 may be determined through the second to fifth main inspection areas MIA2, MIA3, MIA4, and MIA5. The stored main inspection areas may be selectively used based on the type of the semiconductor device 10 that is manufactured in the semiconductor device manufacturing process.

A defect generation rate of the circuit pattern layers may be determined through the main inspection areas. Defect generation rates of the first to fifth circuit pattern layers 30a, 30b, 30c, 30d, and 30e may be determined through the second to fifth main inspection areas MIA2, MIA3, MIA4, and MIA5, respectively. The defects occurring in the fifth circuit pattern layer 30e and the defects occurring in the first to fourth circuit pattern layers 30a, 30b, 30c, and 30d that are stacked on the fifth circuit pattern layer 30e may have an influence relationship. The defect generation rate of the fifth circuit pattern layer 30e and the defect generation rate of each of the first to fourth circuit pattern layers 30a, 30b, 30c, and 30d may have the above influence relationship. The defect generation rate of each of the first to fifth circuit pattern layers 30a, 30b, 30c, 30d, and 30e may be determined through the influence relationship based on the second to fifth main inspection areas MIA2, MIA3, MIA4, and MIA5.

The stored main inspection areas may be updated. The second to fifth main inspection areas MIA2, MIA3, MIA4, and MIA5 may be updated through repeated scan processes. In the repeated scan processes of the first to fifth circuit pattern layers 30a, 30b, 30c, 30d, and 30e of the plurality of semiconductor devices 10, data of the position coordinates of the defects occurring in the first to fifth circuit pattern layers 30a, 30b, 30c, 30d, and 30e may be accumulated. The second to fifth main inspection areas MIA2, MIA3, MIA4, and MIA5 may be continuously updated through the accumulated data.

The stored main inspection areas may be classified and updated based on the type of the semiconductor device. Since the second to fifth main inspection areas MIA2, MIA3, MIA4, and MIA5 may include data related to a specific semiconductor device, the second to fifth main inspection areas MIA2, MIA3, MIA4, and MIA5 may be updated using data of the specific semiconductor device.

The second to fifth main inspection areas MIA2, MIA3, MIA4, and MI5 may be stored together with the type data of the defects. The type data may include data about the causes of the defects. The second to fifth main examination areas MIA2, MIA3, MIA4, and MI5 may be stored with the defects that are generated on the first to fifth circuit pattern layers 30a, 30b, 30c, 30d, and 30e in association with the type data that is input by the user.

The area with the high possibility of the occurrence of the defect may be determined in a subsequent process through the main inspection areas. The main inspection areas obtained from lower layers and the main inspection areas obtained from upper layers may be overlapped each other. The area with the high possibility of the occurrence of the defect may be determined through the overlapped main inspection areas. For example, the possibility of the occurrence of the defects in the first to fourth circuit pattern layers 30a, 30b, 30c, and 30d stacked on the fifth circuit pattern layer 30e may be predicted through the main inspection areas based on the positional coordinates of the defects that are obtained from the fifth circuit pattern layer 30e.

In example embodiments, the method of inspecting the semiconductor device may scan second circuit patterns of a second semiconductor device of the same type as the semiconductor device 10 through the stored main inspection areas (operation S140).

In a manufacturing process of the second semiconductor device, the second circuit pattern layers of the second semiconductor device may be scanned. The second circuit pattern layers of the second semiconductor device may be sequentially scanned based on the priority order. The second circuit pattern layers of the second semiconductor device may be preferentially scanned in the main inspection area.

In example embodiments, second images of the second circuit pattern layers of the second semiconductor device that are scanned based on the priority order may be overlapped with each other, and may be numbered based on a number of overlapped defects (operation S150), and the main inspection areas may be updated through the position coordinates of the numbered or counted defects from the second images (operation S160).

Areas with the high probability of the occurrence of the defects on the second circuit pattern layers of the second semiconductor device may be intensively inspected through the priority order of the main inspection areas. For example, the second circuit pattern layers of the second semiconductor device may be preferentially scanned in the main inspection areas. The second circuit pattern layers may be measured through the random measurement method in areas other than the main inspection areas. A scan speed of the second semiconductor device may be increased through the main inspection areas.

The stored main inspection areas may be updated through the position coordinates that are detected from the second semiconductor device. The stored main inspection areas may be continuously updated, the method of inspecting the semiconductor device may more accurately predict the occurrence of the defect as stored data of the main inspection areas increases.

The area with the high probability of the occurrence of the defects may be determined in the manufacturing process of the second semiconductor device through the main inspection areas. For example, a lower layer may be formed during the manufacturing process of the second semiconductor device. In a process of forming the lower layer, the defects may be scanned. The possibility of the occurrence of the defect in an upper layer stacked on the lower layer may be predicted through the main inspection areas based on the defects scanned from the lower layer.

In example embodiments, the stored main inspection areas may be transmitted to the semiconductor device manufacturing equipment configured to manufacture the semiconductor devices (S170).

The semiconductor device manufacturing equipment may increase semiconductor manufacturing precision in the main inspection area. The semiconductor device manufacturing equipment may improve perfection of the semiconductor device through the main inspection area. For example, the semiconductor device manufacturing equipment may include exposure equipment, etching equipment, and the like.

In example embodiments, the defects may be scanned from the semiconductor devices through the semiconductor device manufacturing equipment (operation S180), and the main inspection areas may be updated based on the position coordinates 42 of the defects that are obtained through the semiconductor device manufacturing equipment (operation S190).

The semiconductor device manufacturing equipment may intensively manufacture or inspect the areas that have the high probability of the occurrence of the defects through the priority order of the main inspection regions.

The stored main inspection areas may be updated through the position coordinates detected from the semiconductor device manufacturing equipment. The stored main inspection areas may be continuously updated, and the method of inspecting the semiconductor device may more accurately predict the occurrence of the defect as the stored data of the main inspection areas increases.

Thus, the method may number or count the defects overlapping each other between the circuit pattern layers 30 based on the number of overlapping defects. Since the main inspection areas are set through the position coordinates 42 of the numbered or counted defects, the area where the defects occur the most among the plurality of circuit pattern layers 30 of the semiconductor device 10 may be specified through the main inspection areas. The main inspection areas may include the hot spots affecting between the plurality of circuit pattern layers 30. The area where the defect is likely to occur among the plurality of circuit pattern layers 30 may be specified through the main inspection areas, and the defects of the semiconductor devices 10 may be quickly and accurately inspected.

Also, the method may increase the reliability of the main inspection areas through repeated inspection processes. In the method, the main inspection areas may be transferred to semiconductor device manufacturing equipment configured to manufacture the semiconductor device 10, and may be utilized. The method may increase the reliability of the main inspection areas through the position coordinates 42 of the defect obtained from the semiconductor device manufacturing equipment.

The foregoing is illustrative of the disclosure and is not to be construed as limiting thereof. Although a few example embodiments have been described, those skilled in the art will readily appreciate that many modifications are possible in example embodiments without materially departing from the novel teachings and advantages of the present disclosure. Accordingly, all such modifications are intended to be included within the scope of the disclosure as defined in the claims.

What is claimed is:

1. A method of inspecting a semiconductor device, the method comprising:
    scanning a plurality of first circuit pattern layers of the semiconductor device, and generating a plurality of first images respectively corresponding the plurality of first circuit pattern layers of the semiconductor device;
    overlapping the plurality of first images with each other and counting a plurality of first defects in the overlapped first images;
    setting main inspection areas with priority orders by using position coordinates of the counted first defects; and
    storing the main inspection areas with the position coordinates of the counted first defects.

2. The method of claim 1, the method further comprising:
    scanning a plurality of second circuit pattern layers of a second semiconductor device in the stored main inspection areas based on the priority orders; and
    generating a plurality of second images respectively corresponding to the plurality of second circuit pattern layers,
    wherein the second semiconductor device is a same type as the semiconductor device.

3. The method of claim 2, the method further comprising:
    overlapping the plurality of second images and counting a plurality of second defects in the overlapped second images; and
    updating the main inspection areas by using position coordinates of the counted second defects in the overlapped second images.

4. The method of claim 1, the method further comprising transmitting the stored main inspection areas to semiconductor device manufacturing equipment configured to manufacture the semiconductor device.

5. The method of claim 4, the method further comprising:
    scanning the plurality of first defects from the semiconductor device with the semiconductor device manufacturing equipment; and
    updating the main inspection areas based on the position coordinates of the plurality of first defects that are obtained through the semiconductor device manufacturing equipment.

6. The method of claim 1, the method further comprising calculating a density of the plurality of first defects by using the position coordinates of the counted first defects.

7. The method of claim 1, wherein the storing the main inspection areas with the position coordinates of the counted first defects comprises storing the main inspection areas based on a location of a specific circuit pattern layer in which the plurality of first defects occurs among the plurality of first circuit pattern layers.

8. The method of claim 1, wherein the storing the main inspection areas with the position coordinates of the counted first defects comprises classifying and storing the main inspection areas based on a type of the semiconductor device.

9. The method of claim 1, wherein the overlapping the plurality of first images with each other and counting the plurality of first defects in the overlapped first images comprises counting the plurality of first defects that overlap from circuit pattern layers adjacent to each other among the plurality of first circuit pattern layers.

10. The method of claim 1, wherein the scanning the plurality of first circuit pattern layers of the semiconductor device comprises scanning the plurality of first circuit pattern layers, the plurality of first circuit pattern layers being stacked in a process of manufacturing the semiconductor device.

11. A method of inspecting a semiconductor device, the method comprising:
    scanning a plurality of circuit pattern layers of the semiconductor device in a process of manufacturing the semiconductor device and generating a plurality of images respectively corresponding the plurality of circuit pattern layers of the semiconductor device;
    overlapping the plurality of images with each other and counting a plurality of defects in the overlapped images;
    setting main inspection areas with priority orders based on a number of the counted defects;
    storing the main inspection areas with position coordinates of the counted defects.

12. The method of claim 11, the method further comprising scanning the plurality of circuit pattern layers of the semiconductor device in the stored main inspection areas based on the priority orders.

13. The method of claim 12, the method further comprising:
    obtaining the position coordinates of the plurality of defects from the plurality of circuit pattern layers scanned based on the priority orders; and
    updating the main inspection areas based on the obtained position coordinates of the plurality of defects.

14. The method of claim 11, the method further comprising transmitting the stored main inspection areas to semiconductor device manufacturing equipment configured to manufacture the semiconductor device.

15. The method of claim 14, the method further comprising:
    scanning the plurality of defects from the semiconductor device with the semiconductor device manufacturing equipment; and updating the main inspection areas based on the position coordinates of the plurality of defects that are obtained through the semiconductor device manufacturing equipment.

16. The method of claim 11, the method further comprising calculating a density of the plurality of defects through the position coordinates of the counted defects.

17. The method of claim 11, wherein the storing the main inspection areas with position coordinates of the counted defects comprises storing the main inspection areas based on a location of a specific circuit pattern layer in which the plurality of defects occurs among the plurality of circuit pattern layers.

18. The method of claim 11, wherein the storing the main inspection areas with position coordinates of the counted defects comprises classifying and storing the main inspection areas based on a type of the semiconductor device.

19. The method of claim 11, wherein the overlapping the plurality of images with each other and counting a plurality of defects in the overlapped images comprises, counting the plurality of defects that overlap from circuit pattern layers adjacent to each other among the plurality of circuit pattern layers.

20. A method of inspecting a semiconductor device, the method comprising:

scanning a plurality of circuit pattern layers of a semiconductor device in a process of manufacturing the semiconductor device and generating a plurality of images respectively corresponding to the scanned circuit pattern layers;

overlapping the plurality of images with each other and count a plurality of defects on the plurality of circuit pattern layers based on a number of the plurality of defects in the overlapped images;

setting main inspection areas with priority orders by using position coordinates of the counted defects;

classifying and storing the main inspection areas with the position coordinates of the counted defects based on a type of the semiconductor devices;

scanning the plurality of circuit pattern layers of the semiconductor device in the stored main inspection areas based on the priority orders;

obtaining the position coordinates of the plurality of defects from the plurality of circuit pattern layers scanned based on the priority orders; and updating the main inspection areas based on the obtained position coordinates of the plurality of defects.

* * * * *